April 5, 1955   J. D. McCOLLOUGH   2,705,599
REEL CLUTCH
Filed April 29, 1950
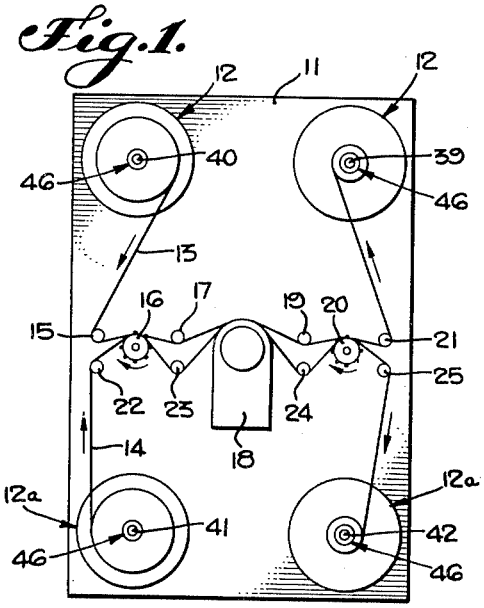
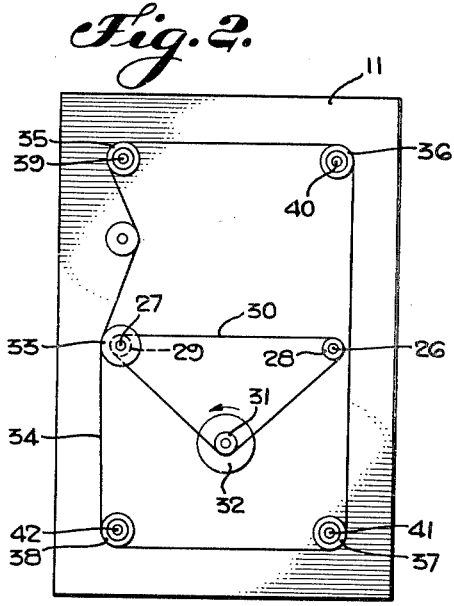
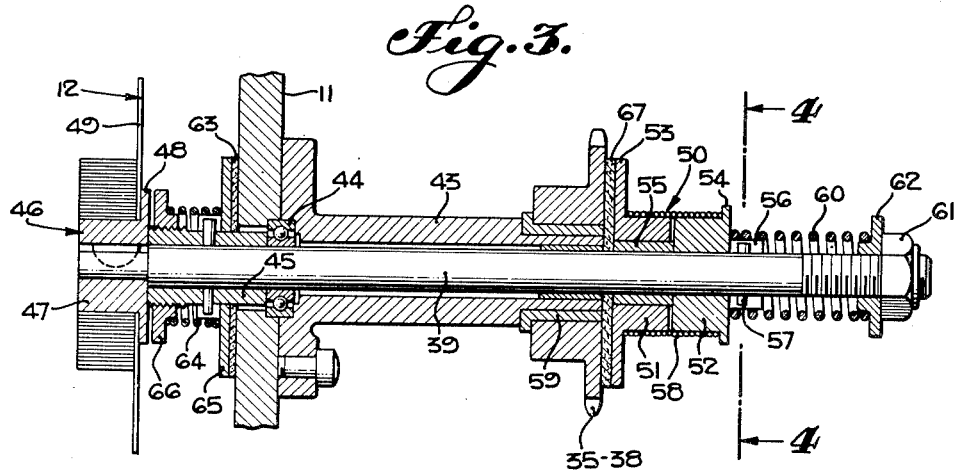
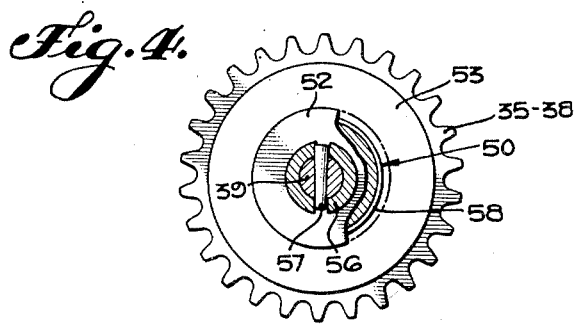
JOHN D. McCOLLOUGH,
INVENTOR.
BY George R. Bliss
ATTORNEY

United States Patent Office 2,705,599
Patented Apr. 5, 1955

2,705,599

REEL CLUTCH

John D. McCollough, Los Angeles, Calif., assignor, by mesne assignments, to Houston-Fearless Corporation, Los Angeles, Calif., a corporation of California Application April 29, 1950, Serial No. 159,063

1 Claim. (Cl. 242—55)

This invention relates to a reversible machine for processing ribbon-like material, in which the material is unwound from a takeoff reel, conducted through a processing device and wound upon a second takeup reel. It has particular relation to the reversible driving mechanism for the material, and for the reels. While the invention has application in a number of fields, it was developed in connection with, and has particular application to a reversible machine for printing a positive motion picture film from a developed negative film, in which the two films may travel in either direction through the machine. While reversible machines of this type are not new, this invention employs novel means for driving the one reel as a takeup reel and braking the other reel as a takeoff reel when the films are traveling in one direction, the same means being effective to drive said other reel as a takeup reel, and brake the said one reel, when the film is traveling on the reverse direction.

One of the objects of the invention is to provide a combined driving and braking device for each reel automatically operating either as a drive or as a brake depending upon the direction of travel of the films. Another object is to simplify the construction of such a machine, and reduce the number of operative parts. Another object is to provide a machine which when reversed is fully automatic in the adjustment of the driving and braking mechanism to function in conformity to the reverse direction of movement of the films, the operator having only to throw a motor switch or a reversing gear lever to operate the moving parts of the machine, and the film in the reverse direction.

While the invention has application wherever a ribbon-like material travels from one reel to another in either direction, it is herein described in a particular embodiment in which the material is processed in its passage from one reel to the other, and in which the material is motion picture film and the processing consists of printing a raw stock positive film from a developed negative. Such a machine is shown in the drawing in which:

Figure 1 is a diagrammatic front elevation of the machine.

Figure 2 is a diagrammatic rear elevation of the machine.

Figure 3 is a longitudinal section of the drive clutch and brake assembly and associated reel.

Figure 4 is a transverse section taken along the line 4—4 of Figure 3.

The machine, which is designed to be operated in a dark room, has a frame consisting of a vertically disposed plate 11, upon which are mounted by means described below, four film reels or spools 12, 12, 12a, 12a,— reels 12, 12 are for coiling the raw stock film upon which the positive picture is to be printed, and reels 12a, 12a are for coiling the negative developed film from which the positive picture is to be printed. Assuming that the raw stock film 13 is traveling from left to right in Figure 1, it travels around guide roller 15 to a toothed wheel 16 which engages the film perforations to drive the film at a constant linear speed, irrespective of the angular speed of the reels 12.

From the toothed wheel 16, the film travels over the guide roller 17, the printer head 18, guide roller 19, toothed wheel 20, guide roller 21 to the other reel 12. The toothed wheel 20 is driven at the same speed as the toothed wheel 16.

At the same time the negative film 14 moves from lefthand reel 12a over the guide roller 22, the toothed wheel 16, guide roller 23, printer head 18, guide roller 24, toothed wheel 20 and guide roller 25 to the right hand reel 12a.

As will be seen in Figure 2, the shafts 26 and 27 of the toothed wheels 16 and 20 which are mounted on the frame plate 11, have mounted on their other ends sprocket chain wheels 28 and 29 driven by a sprocket chain 30, which is in turn driven by a sprocket wheel driven by a power-driven wheel 32. This wheel 32 may be driven by a motor or other suitable power source (not shown).

The shaft 27 which is driven by the sprocket wheel 29, drives a sprocket wheel 33, which engages and drives a sprocket chain 34. This chain 34 passes around and drives four sprocket wheels 35, 36, 37 and 38 which are appreciably smaller than sprocket wheel 33, giving them an angular velocity greater than that of the shafts 26 and 27.

Each of the wheels 35, 36, 37 and 38 are mounted on the frame 11, concentrically and rotatably with respect to reel shafts 39, 40, 41 and 42, upon the other ends of which as can be seen in Figure 1, are keyed the reels 12, 12 and 12a, 12a. The construction and size of the reel shafts and associated clutch and brake mechanisms is identical, and is shown in Figures 3 and 4 which show shaft 39 and its associated parts.

A stationary quill 43 is bolted to the rear of the plate 11. The shaft 39 rotates in a ball bearing 44 seated in a recess formed in adjacent portions of the quill and frame plate. A sleeve 45 pinned to the shaft abuts the outer end of the bearing to prevent inward end play of the shaft. On the outer reduced end of the shaft 39 is keyed the reel 12. Each reel 12 and 12a consists of a spool 46 having a core portion 47 and a flange 48, and preferably also a thin guide disk 49 for aligning the film convolutions as they are wound upon the core 47. The reels or cores are readily removable when fully wound with film, and empty reels may then be keyed to the shaft 39. The outer diameter of the core 47 is the same as that of toothed film drive wheels 16 and 20, with the result that in the winding operation the winding film is always under tension, which increases as the roll of film on the reel increases in diameter. Provision is made for a friction drive of the reel as will later appear.

The reel 12 and reel shaft 39 are driven by a unidirectional friction clutch 50 which is associated with and driven by the sprocket wheels 35. This unidirectional friction clutch assembly comprises a two part drum having an inner part 51 and an outer part 52, each with an end flange 53 and 54 respectively. The part 51 rotates freely on a bearing sleeve 55 between it and the shaft 39. The part 52 has a projection 56 of reduced diameter which is slotted to receive a pin 57 through the shaft and is thus locked to turn with the shaft. Upon these drum parts is placed a close-wound, preferably fine wire, coiled spring 58 without initial tension, which rather loosely fits between the flanges 53 and 54. Seated between the flange 53 and the inner face of the sprocket wheel is a friction disk 67. The sprocket wheel 35 is rotatably mounted on bearing sleeve 59, which by means of a recess in the quill in which it is seated, and an end flange on the bearing sleeve, prevents the sprocket wheel from moving endwise inwardly on the quill, and with respect to the shaft 39. The flange 53 is pressed toward the sprocket wheel 35 with the friction disk 67 between them by means of a coiled spring 60 seated between the inner end of the drum part 52 and a collar 62 which is adjustable longitudinally along the shaft 39 by means of a nut 61 threaded on the shaft.

A friction disk 63 is pressed against the outer face of the frame plate 11 by a coiled spring 64, seated between a metal disk 65 which bears against the friction disk and a collar 66 threaded on the sleeve 45. This assembly acts as a brake to prevent free turning of the reel during its unwinding, and during the winding operation is operative but performs no useful function.

In the operation of the machine the power is applied to wheel 32 in the direction of the arrow, Figure 1, which drives the film 13 and 14 in the linear direction shown at the left hand side of Figure 1 by means of sprockets 16 and 20 on shafts 26 and 27, pulling the films 13 and 14 from left hand reels 12 and 12a against the associated friction brakes 63. The shafts 40 and 41 turn more and more rapidly as the film rolls on left hand reels 12 and 12a become smaller in diameter, but even at the final most rapid angular velocity of these shafts, they do not revolve as rapidly as the sprocket wheels 36 and 37 on the other end of the shafts 39 and 42, because sprocket wheel 33 and toothed wheel 16 have the same angular speed and sprocket wheel 36 being appreciably smaller than sprocket wheel 33, turns more rapidly than sprocket wheel 33, and the reel core and toothed wheel 16 being of the same diameter have the same angular speed at the end of the unwinding operation.

The right hand drum 52 of the upper left hand reel assembly 12 (Figure 1) is therefor when unwinding always rotating less rapidly than the left hand drum 51. Since the unidirectional drive coil 58 is wound right hand to permit the drum 51 to freewheel ahead of the drum 52 when the assembly is rotating in a clockwise direction, looking from the left end of Figure 3, and when the drum 51 is being driven by sprocket 36 more rapidly than drum 52, the sprocket wheel 36 rotates due to its engagement with the sprocket chain 34, but this rotation is an idling operation incidental to the unwinding of left hand reel 12. While left hand reel is unwinding, under the pull of the film and toothed wheel 16, right hand reel 12 is winding the film 13. Sprocket wheel 35 through the friction disk 67, drum part 51, and wire coil 58 drives drum part 52, shaft 39 and reel core 47 in a clockwise direction looking again from the left hand end of the assembly shown in Figure 2, because the wire coil 58 is wound to grip 52 when drum part 51 is the driving element, and when the rotation is in the clockwise direction in the right reel assembly 12 (which is the reverse of the condition of the winding of the coil wire 58 of left reel assembly 12, wound left hand). Since sprocket wheels 35 and 36 are of the same diameter and smaller than that of the drive sprocket wheel 33, and since drive sprocket wheel 33 and toothed wheels 28 and 29 all have the same angular velocity, and since further the diameters of the toothed wheels 28 and 29 are the same as the diameters of the reel cores 47, the sprocket wheel 35 always overdrives the winding core 47, even at the initial stage of the winding operation.

If the drive sprocket 33 is the same size as the driven sprockets, at the instant the winding begins there would be no overdrive, but as the diameter of the film roll increases, the overdrive condition would at once begin. While preferable, it is not absolutely necessary that drive sprocket 33 be larger than the driven sprockets 35 and 36, but it must be at least as large.

Also, it is not necessary that the film drive toothed wheels be of the same diameter as the reel cores, provided that any difference in these diameters is compensated for by a corresponding change in the ratio of the chain driving and chain driven sprocket wheels. As the standard reel core diameter is two inches and the standard film driving toothed wheel is also two inches, this compensation is not required in actual practice.

From the foregoing considerations, it will be evident that the angular velocity or speed of rotation of each clutch driving sprocket wheel must always be greater than the angular velocity or the speed of rotation of the reel. This is true whether the sprocket wheel is overdriving the reel or whether the sprocket wheel is turning in the reverse direction. Under this latter condition it must always be turning more rapidly than the reel so that the reel may not, during its unwinding, be locked to the sprocket wheel by the unidirectional clutch and be prevented from unwinding as rapidly as it should to accommodate the speed of linear movement of the film.

Letting $V^{sp}$ equal the angular speed of the clutch driving sprocket wheel and $V^r$ equal the angular speed of the reel, the relationship of these two speeds for correct operation of the machine must then be in accordance with the following equation: $V^{sp}/V^r > 1$.

Now letting V equal the angular speed of the main power drive shaft and letting R equal the pitch radius of the chain-drive sprocket, and CS equal the chain speed: $CS = 2\pi RV$.

Letting $R^{sp}$ equal the pitch radius of the clutch driving sprocket, then $$V^{sp} = CS \div 2\pi R^{sp} = 2\pi RV/2\pi R^{sp} = RV/R^{sp}$$

Similarly ascertaining the value of $V^r$, let r equal the radius of the film driving sprocket and FS equal the film speed. FS, then $= 2\pi rV$.

Letting $R^c$ equal the diameter of the reel core, $V^r$ is equal to the film speed divided by $$2\pi R^{rc} = 2\pi rV/2\pi R^c = rV/R^{rc}$$

The ratio, then, of the angular velocity of the clutch drive sprocket wheel to the angular velocity of the reel is:

$$V^{sp}/V^r = RV/R^{sp}/rV/R^c > 1$$

Cancelling out V—

$$R/R^{sp}/r/R^c > 1$$

Reducing this to a simple fraction—

$$R \times R^c/r \times R^{sp} > 1$$

or $$R/r \times R^c/R^{sp} > 1$$

Now letting the ratio $R/r$ equal A and the ratio $R^c/R^{sp}$ equal B, $AB > 1$; that is, the ratio of the pitch radius of the chain-driving sprocket wheel to the radius of the film driving toothed wheels, multiplied by the ratio of the radius of the reel core to the pitch radius of the clutch driving sprocket wheel must not be less than 1 for proper operation of the machine.

Since the ratio of chain speed to film speed, $$CS/FS = \frac{2\pi RV}{2\pi rV} = \frac{R}{r} = A$$

it is also true that the ratio of the chain speed to the film speed, multiplied by the ratio of the radius of the reel core to the radius of the clutch driving sprocket wheel, must be not less than 1 for proper operation of the machine.

What I claim is:

A winding and reeling device for transferring a tape from a first coiled formation to a second coiled formation and vice versa, including in combination: a mounting structure comprising a vertically disposed plate; two shafts rotatably mounted perpendicularly to said plate in bearing quills secured to said plate in transversely aligned positions removed from each other, each of said shafts projecting outwardly from said plate on each side thereof; two reels for coiling the tape having cylindrical cores of equal diameter, said reels being removably and non-rotatably secured on one end of each of said shafts; a friction brake interposed between each shaft and said mounting structure, each of said friction brakes comprising an adjustably spring-pressed friction disc assembly disposed longitudinally and operatively between the reel and plate, said disc bearing against said plate; two sprocket wheels of the same pitch diameter mounted rotatably with respect to said mounting structure and concentrically with respect to said two shafts respectively, said sprocket wheels being mounted toward the other end of said shafts; a unidirectional frictional clutch interposed between each of said sprocket wheels and its associated shaft, each of said friction clutches comprising a friction disc bearing against the outer side of said sprocket, a drum divided into two abutting parts on an axially transverse plane and flanged at each end and wrapped by a circumferentially snugly fitting wire coil longitudinally loosely disposed between the flanges, the inner of said parts being revolvably mounted on the shaft with its flange bearing against the friction disc, and the outer of said parts being non-rotatably and axially and slidably secured to the shaft, said friction clutch further comprising a longitudinally adjustable collar element on the outer end of said shaft, and a coil spring seated between the collar element and the outer of said parts of said drum, the driving direction of rotation of one of said clutches being in the opposite sense from the driving direction of rotation of the other; an endless sprocket chain engaging both the sprocket wheels; a reversible power driven shaft; a sprocket wheel fixedly mounted on the power driven shaft and engaging the sprocket chain; a power driven means reversible simultaneously with the power driven shaft for engaging and driving the tape at a linear speed bearing a constant ratio to the linear speed of the sprocket chain, the product of the ratio of the chain speed to the tape speed and the ratio of the diameter of the reel cores to the pitch diameter of the clutch driving sprocket wheels being at least equal to unity, whereby the angular velocity of each of the clutch driving sprocket wheels is at least as great as the angular velocity of the associated reel and shaft at the initial stage of the winding operation or the final stage of the unwinding operation of the tape on the associated reel.

References Cited in the file of this patent

UNITED STATES PATENTS

| Number | Name | Date |
|---|---|---|
| 259,572 | Moebius | June 13, 1882 |
| 786,294 | Joy | Apr. 4, 1904 |
| 849,184 | Auld | Apr. 2, 1907 |
| 850,164 | Klocke | Apr. 16, 1907 |
| 1,480,992 | Chipman | Jan. 15, 1924 |
| 2,019,260 | Howell | Oct. 29, 1935 |
| 2,161,941 | Zopp | June 13, 1939 |
| 2,173,768 | Sabol | Sept. 19, 1939 |
| 2,209,582 | Ross | July 30, 1940 |
| 2,257,172 | Klemola | Sept. 30, 1941 |
| 2,313,662 | Morgan | Mar. 9, 1943 |
| 2,325,885 | Serrurier | Aug. 3, 1943 |
| 2,352,077 | Clough | June 20, 1944 |
| 2,385,479 | Underhill | Sept. 25, 1945 |
| 2,509,791 | Swanson | May 30, 1950 |
| 2,517,887 | Korn | Aug. 8, 1950 |
| 2,575,012 | Harvey | Nov. 13, 1951 |

FOREIGN PATENTS

| Number | Country | Date |
|---|---|---|
| 139,202 | Austria | Oct. 25, 1934 |